United States Patent
Allen et al.

(10) Patent No.: US 6,807,313 B1
(45) Date of Patent: Oct. 19, 2004

(54) METHOD OF ADAPTIVELY ENHANCING A DIGITAL IMAGE

(75) Inventors: Daniel J. Allen, Derry, NH (US); Adam L. Carley, Windham, NH (US); Vladmir Levantovsky, North Andover, MA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/511,432

(22) Filed: Feb. 23, 2000

(51) Int. Cl.[7] ............. G06K 9/40; G06K 15/00; G09G 5/02
(52) U.S. Cl. ............ 382/254; 382/162; 382/173; 358/2.1; 358/447; 345/597
(58) Field of Search ............... 382/162, 275, 382/164–173, 176, 180, 210, 254, 274, 260–266, 298, 299, 300; 358/1.2, 2.99, 3.01, 461, 447, 518, 1.6, 2.1, 3.07, 515, 521, 522, 528, 532; 345/589, 597

(56) References Cited

U.S. PATENT DOCUMENTS

| | | | |
|---|---|---|---|
| 5,339,172 A | * 8/1994 | Robinson | 358/462 |
| 5,341,226 A | * 8/1994 | Shiau | 358/518 |
| 5,760,921 A | * 6/1998 | Miyake | 358/3.07 |
| 5,822,467 A | * 10/1998 | Lopez et al. | 382/261 |
| 5,956,470 A | * 9/1999 | Eschbach | 358/1.9 |
| 6,069,707 A | * 5/2000 | Pekelman | 358/1.6 |
| 6,078,697 A | * 6/2000 | Ng | 382/275 |
| 6,137,907 A | * 10/2000 | Clark et al. | 382/180 |
| 6,295,041 B1 | * 9/2001 | Leung et al. | 345/89 |
| 6,411,735 B1 | * 6/2002 | Williams et al. | 382/224 |

* cited by examiner

Primary Examiner—Kanji Patel
(74) Attorney, Agent, or Firm—Testa, Hurwitz & Thibeault, LLP (57) ABSTRACT

The present invention relates to a method of adaptively enhancing a digital image based on image content. An accurate determination of image type permits implementation of an image enhancement technique that is matched to the image type. The method is advantageous when the image type of the received images can vary. In one embodiment the method distinguishes between line art images and continuous tone images. The method includes application of a window to a pixels in a source array. The number of colors in each of the resulting windowed arrays is determined. Each color can optionally be defined as a range of colors. A color range total is calculated from the sum of the number of windowed arrays in one or more subsets of the plurality of possible numbers of colors. Image type is determined in response to the color range total and an enhancement process matched to the image type is applied to the digital image data.

9 Claims, 6 Drawing Sheets

METHOD OF ADAPTIVELY ENHANCING A DIGITAL IMAGE

FIELD OF THE INVENTION

The invention relates generally to a method for adaptively enhancing a digital image based on image content. In particular, the invention relates to a method of improving the image quality of a digital image received via the world wide web (i.e., the Internet) by determining its image type and applying an appropriate enhancement technique.

BACKGROUND OF THE INVENTION

Images printed from the Internet often appear coarse due to the resolution of the digital image data. For example, jagged structure is often observable along lines and edge features in the image. Commercially available printers generally have output resolutions which exceed the resolution of Internet images. Unfortunately, the higher printer resolution typically is not useful for improving the quality in the printed image.

Digital images can generally be characterized as either line art images or continuous tone images. Line art images typically include backgrounds and/or objects having spatially invariant color and intensity. Examples of line art images include block diagrams, road maps, computer generated images (e.g., weather maps, computer game images) and standard text. Continuous tone images are characterized by a greater number of colors and intensities. Examples of continuous tone images include photographic images, anti-aliased text and graphics.

Line art images and continuous tone images can be processed so that the printed image has a higher quality than an unprocessed printed image. Due to the difference in image content, however, the methods used to enhance these images are different. Because a web page can contain both types of images, implementation of only one enhancement method results in some images not being optimally enhanced. Moreover, even if line art enhancement and continuous tone enhancement methods are available, application of the appropriate method cannot be determined in advance due to the absence of any identifier of image type transmitted with the image data.

SUMMARY OF THE INVENTION

The present invention relates to a method of enhancing a digital image. The invention applies a preferred one of a plurality of enhancement techniques to be automatically applied to a received digital image based upon its image type. The method includes the steps of receiving a source array of RGB image pixels. Based on the values of the RGB image pixels, a determination is made as to whether the image corresponds to one of a first and a second image type. The source array is processed with a first enhancement technique if the source array is determined to be of the first image type or processed with a second enhancement technique if the source array is determined to be of the second image type. In one embodiment, the source array is received from a web page. In another embodiment, the first image type is a line art image. In another embodiment, the second image type is a continuous tone image.

In another aspect, a method of determining the image type of a digital image includes receiving a source array of RGB pixels and applying an M by N window to each of a plurality of pixels in the source array to generate a plurality of windowed arrays. The color number (i.e., the number of different colors) for each of the windowed arrays is determined. For each of a plurality of color numbers, the number of windowed arrays having the respective color number is determined. An image type is determined in response to the determinations of the number of windowed arrays having the respective color number. In one embodiment, each of the colors corresponds to a respective predetermined range of RGB values.

In one embodiment, the image type is determined by calculating, for a subset of the plurality of color numbers, a color range total and determining the image type in response to the color range total. In another embodiment, the method includes the additional step of calculating, for a complementary subset of the plurality of color numbers, a complementary color range total. In one embodiment, the image type is determined by calculating a ratio of the color range total and the complementary color range total, and determining the image type in response to the ratio.

In another aspect, the invention features a system for enhancing a digital image. The system includes an image switch having a switch input, a first switch output and a second switch output. The system also includes a first processing module having an input in communication with the first switch output and a second processing module having an input in communication with the second switch output. The image switch provides digital image data received at the switch input to the input of the first processing module if the image type is a first image type. The image switch provides the digital image data to the input of the second processing module if the image type is a second image type. The first processing module and the second processing module provide enhanced digital image data at their respective outputs in response to digital image data received at their respective inputs.

BRIEF DESCRIPTION OF THE DRAWINGS

The foregoing and other objects, features and advantages of the invention are apparent from the following more particular description of preferred embodiments of the invention, as illustrated in the accompanying drawings. The drawings are not necessarily to scale, emphasis instead being placed on illustrating the principles of the present invention.

DESCRIPTION OF THE INVENTION

Figure 1:
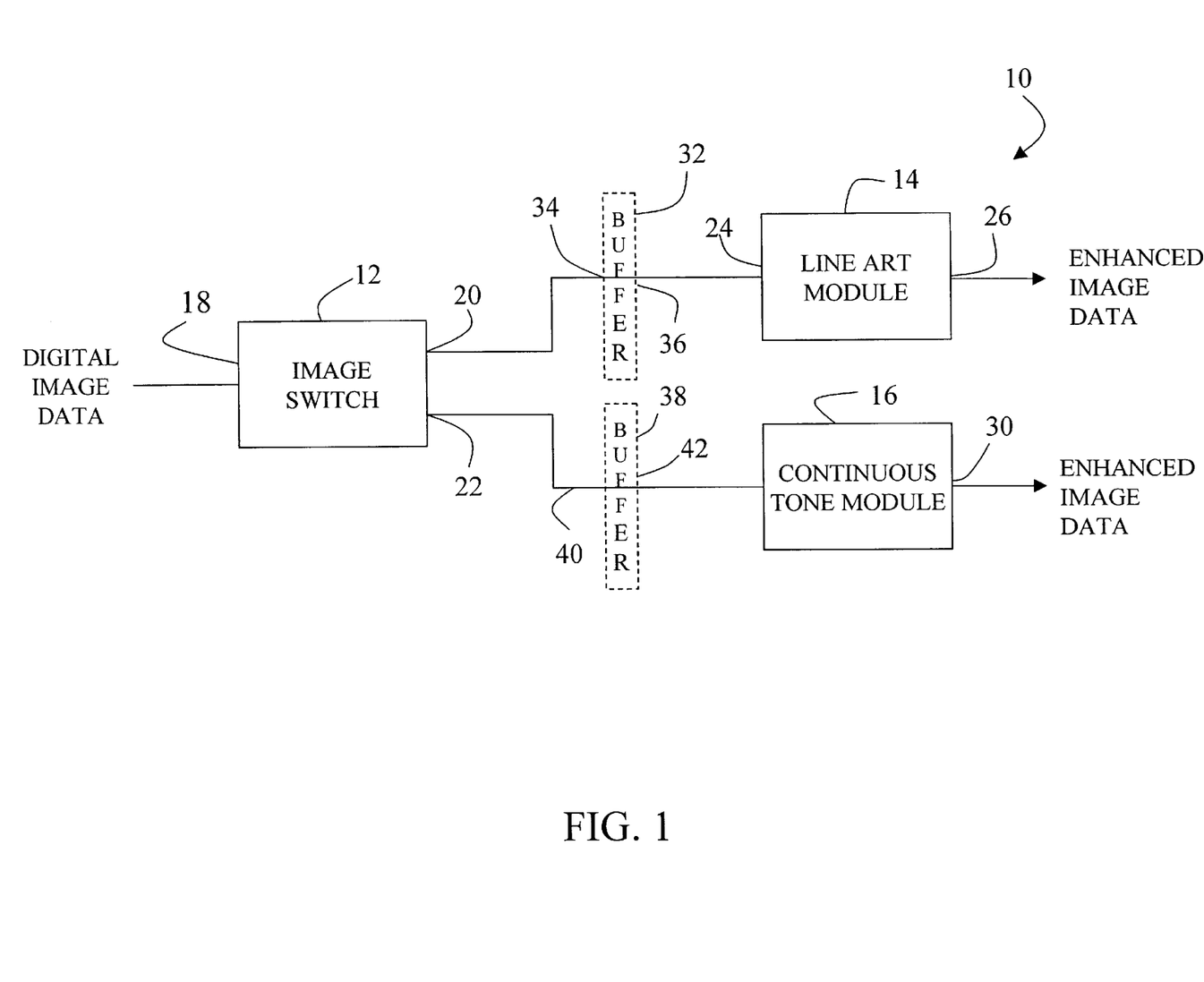
FIG. 1 is a functional block diagram of a system for enhancing an embedded image.

Referring to FIG. 1, a system 10 for enhancing a digital image includes an image switch 12, a line art module 14 and a continuous tone module 16. The image switch 12 includes a switch input 18, a first switch output 20 and a second switch output 22. The line art module 14 has an input 24 coupled to the first switch output 20, and an output 26. The continuous tone module 16 has an input 28 coupled to the second switch output 22, and an output 30.

Digital image data (e.g., image data embedded in a downloaded web page) received at the input 18 of the switch 12 is routed through the first switch output 20 to the line art module 14 if the switch 12 determines that the image data corresponds to a line art image. The line art module 14 provides enhanced image data at its output 26. If the switch 12 determines that the image data corresponds to a continuous tone image, the data is routed through the second switch output 22 to the continuous tone module 16. The continuous tone module 16 provides enhanced image data at its output 30. While they are shown as modules, one of ordinary skill in the art would recognize that these two modules are algorithms acted upon by one or multiple processors. Thus, the image switch 12 enables implementation of the preferred enhancement method based on the type of image as determined from the digital image data.

In one embodiment, the system 10 also includes a first buffer 32 and a second buffer 38. The first buffer 32 has an input 34 coupled to the first switch output 20 and an output 36 coupled to the input 24 of the line art module 14. The second buffer 38 has an input 40 coupled to the second switch output 22 and an output 42 coupled to the input 28 of the continuous tone module 16. The buffers 32 and 38 receive digital data from the image switch 12 and temporarily store the data until it is retrieved by the respective module 14 and 16.

In one example, the method implemented by the line art module 14 includes the image processing method disclosed in U.S. patent application Ser. No. 08/685,804, filed Jul. 24, 1996. The method includes the application of a window filter to a pixel in a digital image data to generate an array of windowed pixels. Edges are detected in the windowed array by determining the color difference between adjacent pixels. The resulting edge map is processed using logical operations to determine a case number indicative of an inferred edge location (i.e., the predicted edge location and orientation for the edge in an infinite resolution image). The inferred edge location is generally not precisely reproducible in the enhanced output data due to the finite printer resolution. However, because the printer resolution is typically several times greater than the source image resolution, the inferred edges reproduced in the printed document generally result in a substantial improvement in observable image quality.

In another example, the method implemented by the continuous tone module 16 includes the image processing method disclosed in U.S. patent application Ser. No. 09/338, 011, filed Jun. 22, 1999. The method includes selecting, for a single pixel in the source image, a corresponding block (i.e., window) of source pixels. Horizontal and vertical edge maps are generated after detecting edges based on color differences in the block of source pixels. The edge arrays are processed with a set of logical operations to detect features. The intensity of the output pixel is determined from the effective location of a corresponding source pixel based on the detected feature. The value of the output pixel is interpolated from adjacent pixels in the block of source pixels relative to the effective location of the corresponding source pixel. The effective source location can be modified according to a predetermined modifier function prior to interpolation. The method is repeated for other pixels in the source image to generate enhanced image data. The enhanced data can be further processed by other enhancement methods (e.g., edge sharpening) prior to providing the enhanced data to the printer.

Both methods provide the benefit of scaling of the source data to higher resolution for printing. The line art method uses the colors of adjacent pixels in the source image to generate the corresponding colors for the edge in the output image. In contrast, the continuous tone method interpolates between source pixel intensities to generate adjusted intensity values for the pixels associated with the edge in the output image while preserving the original color values.

Figure 2:
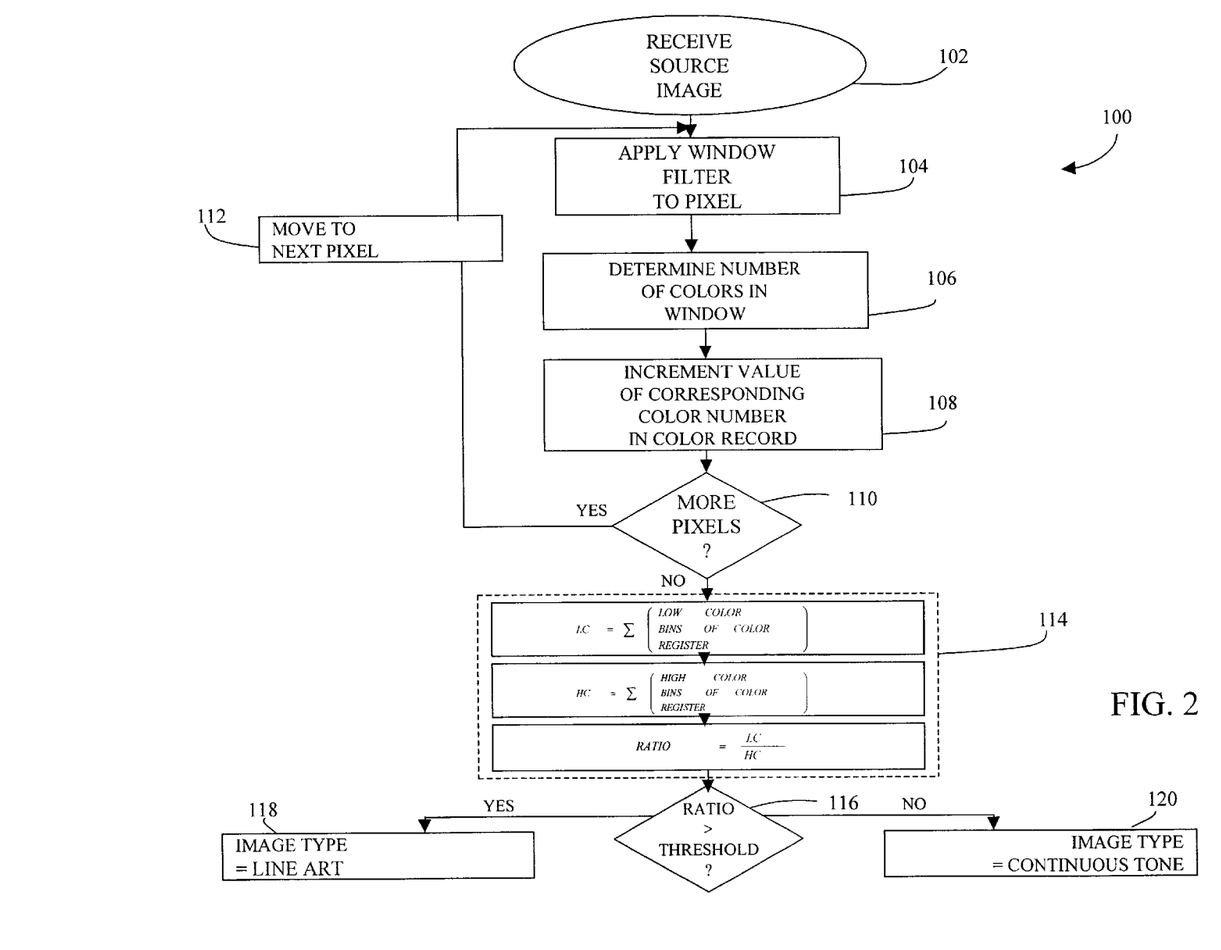
FIG. 2 is a flowchart representation of an illustrative method for determining the image type of an embedded image according to an embodiment of the invention.

Referring to FIG. 2, an illustrative embodiment of a method 100 of identifying the image type of a source array is shown. The source array can be representative of an image embedded on a web page downloaded from a server through the Internet. The image is characterized by two or more image types and there can be multiple images embedded on the web page. In an exemplary embodiment, the method includes receiving a an array of RGB source pixels (step 102). A window filter is applied to a source pixel to yield a 3 by 3 array of windowed pixels which includes the source pixel (step 104). In other embodiments, the window filter can yield additional or fewer pixels. Moreover, the shape of the window filter is not limited to a square but can be a rectangle, nominal circle or other geometric configuration.

Figure 3:
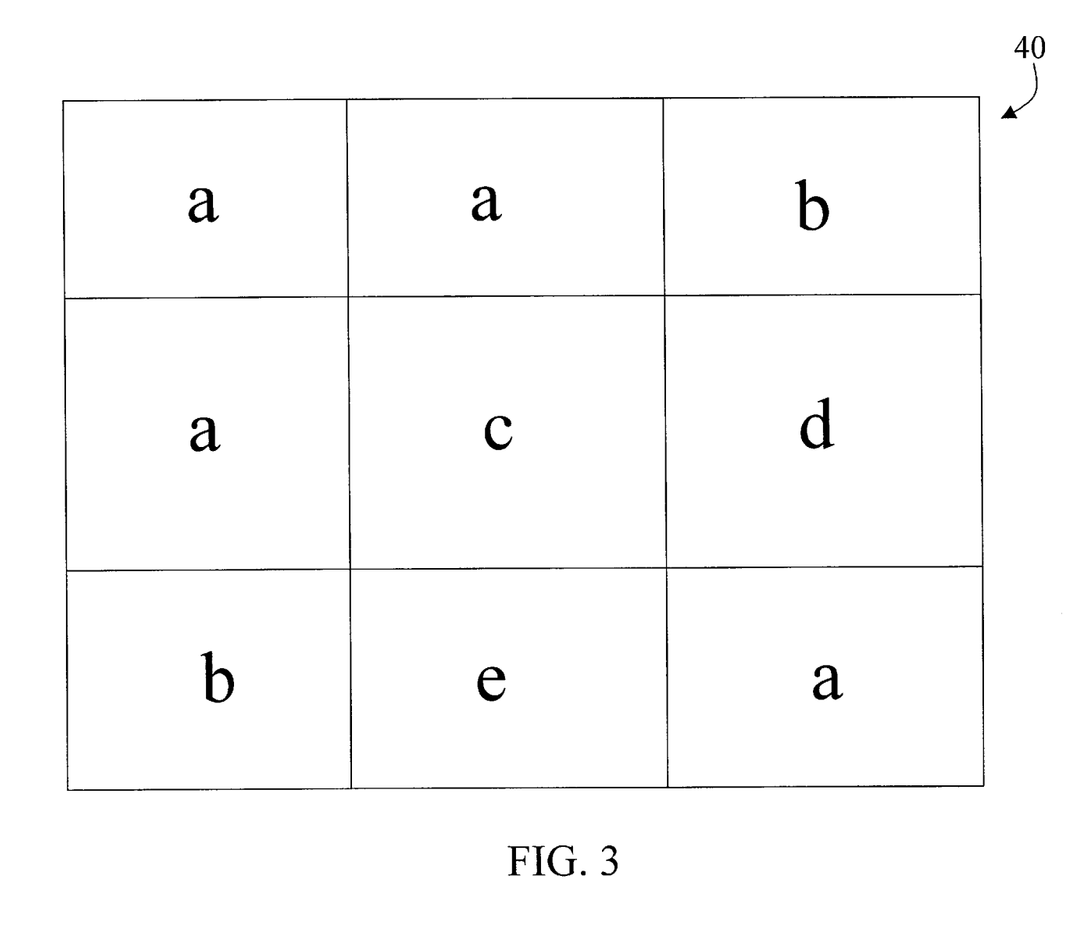
FIG. 3 is an illustration of the color distribution in an array of windowed pixels used for the image type.
Figure 4:
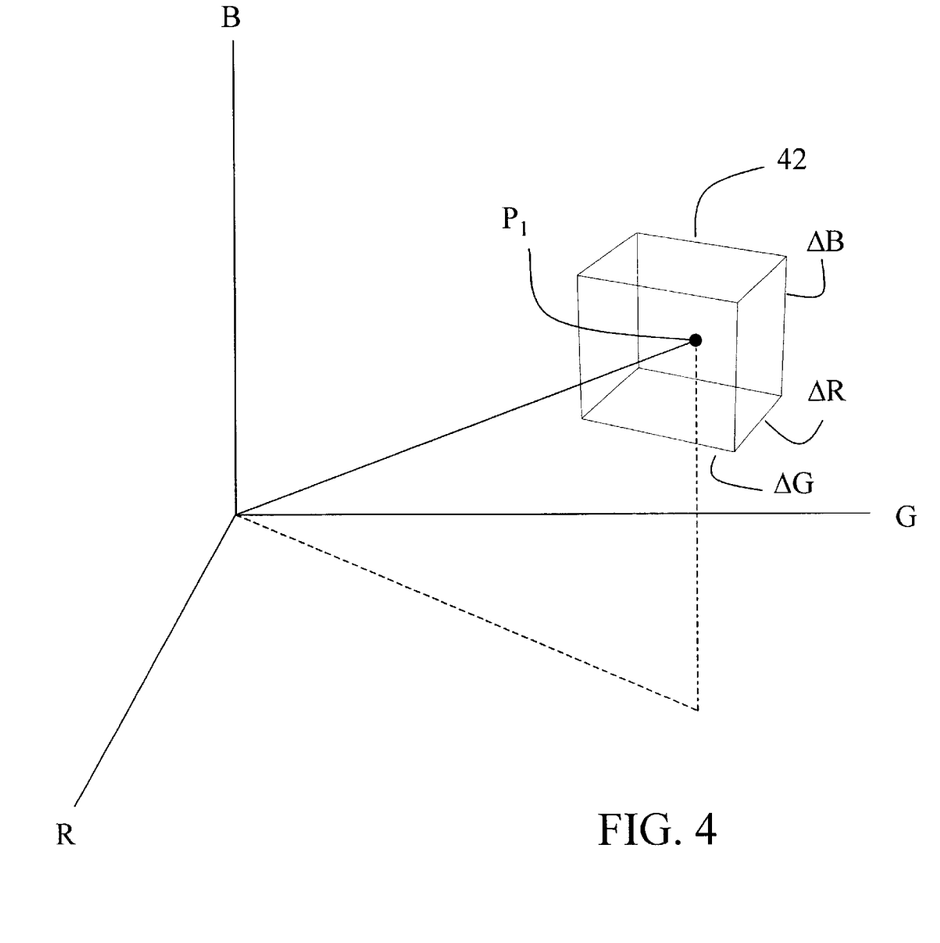
FIG. 4 is an illustration depicting a color coordinate and its associated color range.

Referring to FIG. 3, one example of an array of windowed pixels 40 includes pixels having a color number of five (i.e., five different colors in the window) where the five colors are represented by the letters a, b, c, d and e. Thus, the array of windowed pixels 40 has four pixels of color a, three pixels of color b, and one pixel for each of colors c, d and e. In one embodiment, each color is defined as a unique RGB coordinate. In another embodiment, a single color includes a range of RGB values surrounding a given RGB value as shown in FIG. 4. For example, a second color coordinate $P_2$ (not shown) is considered to represent the same color as a first color coordinate $P_1$ if the second color coordinate $P_2$ lies within a box 42 of predetermined length $\Delta R$, width $\Delta G$ and height $\Delta B$ centered on the first coordinate $P_1$. The dimensions of the box 42 are preferably equal (i.e., $\Delta R$, $\Delta G$ and $\Delta B$ are equal). The dimensions can be changed to adjust the sensitivity (i.e., size of color range) of the method to ignore minor color variations between the pixels in the windowed array 40. Such an adjustment is typically based on a priori knowledge of the received digital images.

Referring back to FIG. 2, the color number for the array of windowed pixels is determined (step 106). The population of the respective color number in a color record is incremented (step 108). The color record includes nine bins corresponding to the nine possible color numbers for the 3 by 3 array of windowed pixels. The color number is one if all pixels in the array of windowed pixels are the same color. Conversely, the color number is nine if each of the pixels in the array of windowed pixels is a different color than the other windowed pixels.

The method 100 determines whether there are more pixels in the source array to be windowed (step 110). If at least one pixel remains to be processed, the method 100 moves to the next pixel (step 112) and returns to step 104 to apply the window filter. If no more pixels are to be windowed, the method 100 proceeds to step 114 to calculate a discriminant used to determine the image type.

Figure 5A:
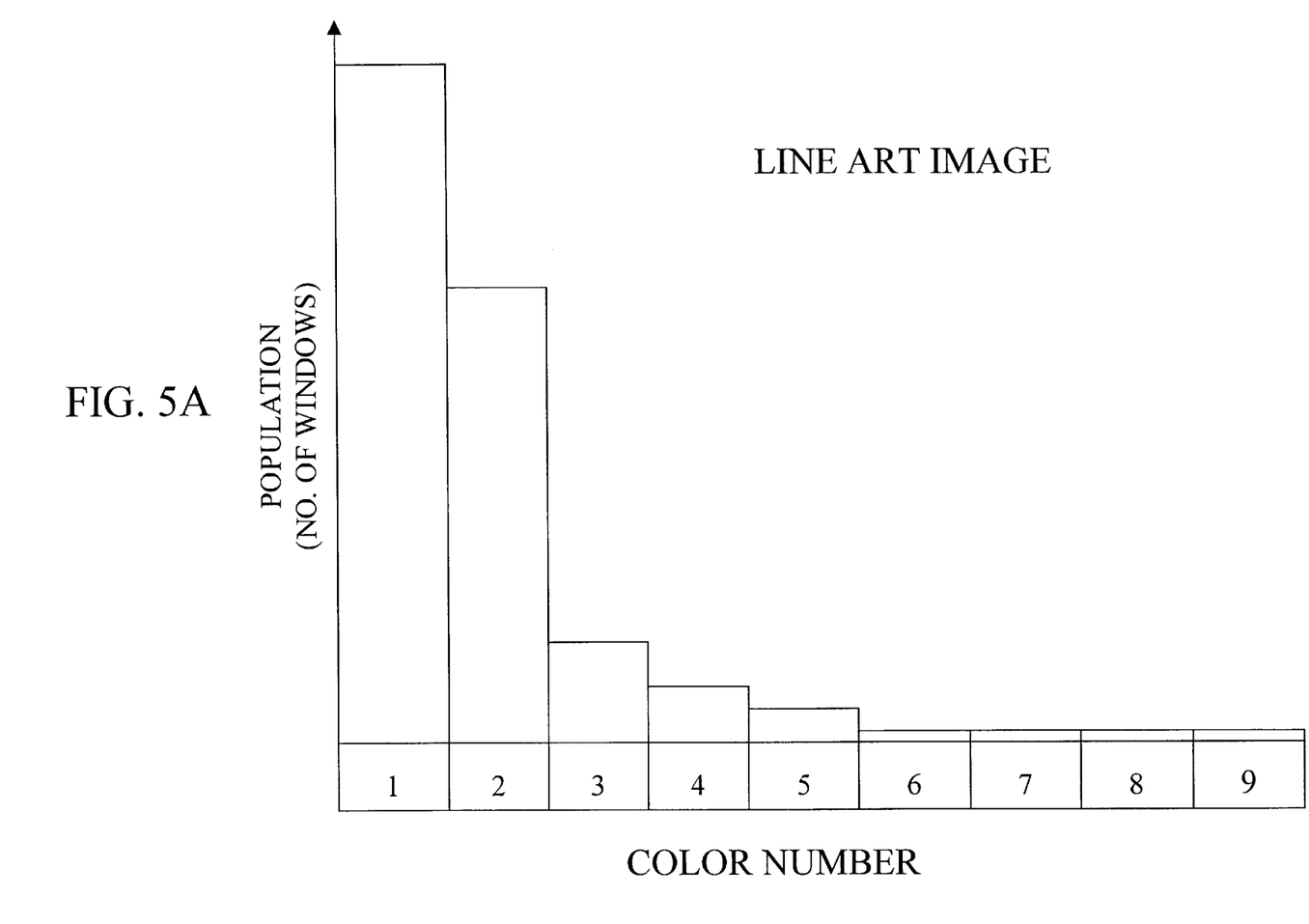
FIGS. 5A and 5B are exemplary histograms showing the population of color numbers as a function of color number for a line art image and a continuous tone image, respectively.

FIG. 5A is an illustration of an example histogram depicting the population of color numbers in a color record for a line art image. The vertical axis corresponds to the population (i.e., number of arrays of windowed pixels) for the color number indicated along the horizontal axis. Because of the nature of line art images, many of the 3 by 3 arrays of windowed pixels from a line art image include a spatially-invariant background, thus such arrays have a color number of one. Similarly, windowed arrays generated from pixels within a single colored object also have a color number of one. If a transition between background and an object or line occurs in the windowed array, the corresponding color number is at least two. If a window filter is applied to a bitonal array, only color numbers of one or two are possible. For line art images, high color numbers generally only occur when multiple features are included within the arrays of windowed pixels. Thus a line art image generally has a histogram in which most of the populations of the low color numbers are substantially higher than the populations of the high color numbers.

Figure 5B:
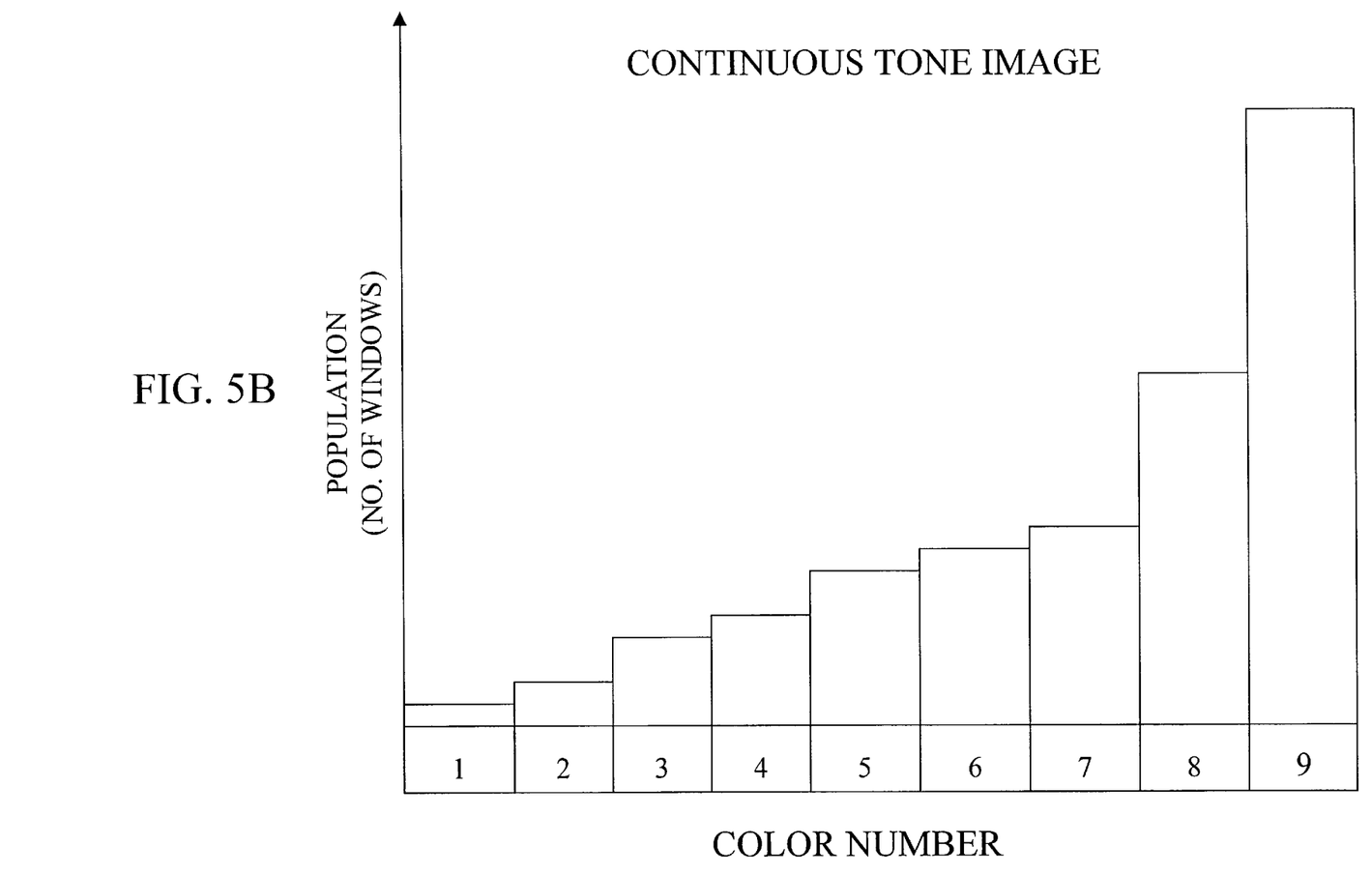

FIG. 5B is an illustration of a histogram (i.e., a color record) depicting the populations of color numbers in a color record for a continuous tone type image. Continuous tone images typically include many colors. The probability that an adjacent pixels in a continuous tone image have the same color is low in comparison to the same probability for line art images. Consequently, the populations of the higher color numbers for a continuous tone images are generally higher than those for line art images.

The population of the color record provides data which can be used to determine the image type. In one embodiment, the population of a subset of the color numbers in the color record is examined and used as a basis for determining the image type. In another embodiment, the population of a complementary subset of color numbers (i.e., the color numbers not included in the other subset of color numbers) is determined and the image type is determined by the relationship of both subsets.

Referring back to the embodiment of FIG. 2, a discriminant RATIO is calculated as $$\text{RATIO} = \frac{LC}{HC}$$

where LC, the color range total, is the sum of the populations of color numbers in a subset that includes the lowest color numbers in the color record and HC, the complementary color range total, is the sum of the populations in a subset that includes the remaining color numbers in the color record (step 114). For example, LC can be defined as the sum of the populations in color numbers 2 to 4 and HC can be defined as the sum of the populations in color numbers 5 to 9. The background of the image results in a substantial contribution to the population in color number 1, therefore, color number 1 is generally ignored in calculating the discriminant. It should be understood that the discriminant can be defined by other mathematical functions applied to one or more subsets of the color record. Moreover, subsets are not required to be mutually exclusive in their representation of color numbers.

The discriminant RATIO is compared to a threshold value to determine the image type (step 116). If a line art image is examined, the population is generally greatest in the lower color numbers. Consequently, LC is large relative to HC and the discriminant RATIO is large. However, for continuous tone images, the population is generally greatest in the higher color numbers. Thus, LC is small relative to HC and the discriminant RATIO is small. If the discriminant RATIO exceeds the threshold value, the image type is determined to be a continuous tone image (step 118). Conversely, if the discriminant RATIO does not exceed the threshold value, the image type is determined to be a continuous tone image (step 120).

In other embodiments, the method can determine additional image types according to the relative populations in the color record. Moreover, the method is not limited to differentiation of only two image types. Thus, an image can be characterized as one of a plurality of image types and processed by a corresponding one of a plurality of enhancement techniques.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of determining the image type of a digital image comprising:

receiving a source array of RGB image pixels;

applying an M by N window to each of a plurality of pixels in the source array to generate a plurality of windowed arrays;

determining a color number for each of said plurality of windowed arrays;

determining, for each of a plurality of color numbers, the number of windowed arrays having the respective color number;

determining the image type of the digital image in response to the determinations of the number of windowed arrays having the respective color number;

processing the source array with a first enhancement technique if the source array is determined to be of a first image type; and processing the source array with a second enhancement technique if the source array is determined to be of a second image type.

2. A method of determining the image type of a digital image comprising:

receiving a source array of RGB image pixels;

applying an M by N window to each of a plurality of pixels in the source array to generate a plurality of windowed arrays;

determining a color number for each of said plurality of windowed arrays;

determining, for each of a plurality of color numbers, the number of windowed arrays having the respective color number; and determining the image type of the digital image in response to the determinations of the number of windowed arrays having the respective color number.

3. The method of claim 2 wherein the step of determining the image type comprises:

determining the image type of the digital image in response to the color range total.

4. The method of claim 2 wherein the M by N array is a square array.

5. The method of claim 2 wherein each of the colors corresponds to a respective predetermined range of RGB values.

6. The method of claim 3 further comprising the step of calculating, for a complementary subset of the plurality of color numbers, a complementary color range total in response to the number of windowed arrays having one of the respective color numbers of the complementary subset.

7. The method of claim 6 wherein the step of determining the image type comprises:

calculating a ratio of the color range total and the complementary color range total; and determining the image type of the digital image in response to the ratio.

8. The method of claim 7 wherein the step of determining the image type in response to the ratio comprises:

comparing the ratio to a threshold value; and determining the image type of the digital image in response to the comparison.

9. The method of claim 2 wherein M=3 and N=3.

* * * * *